US010726005B2

(12) United States Patent
Verma et al.

(10) Patent No.: US 10,726,005 B2
(45) Date of Patent: Jul. 28, 2020

(54) VIRTUAL SPLIT DICTIONARY FOR SEARCH OPTIMIZATION

(71) Applicant: SAP SE, Walldorf (DE)

(72) Inventors: Sudhir Verma, Gurgaon (IN); Pravesh Verma, Delhi (IN); Vidur Sailendra Bhatnagar, Roorkee (IN)

(73) Assignee: SAP SE, Walldorf (DE)

( * ) Notice: Subject to any disclaimer, the term of this patent is extended or adjusted under 35 U.S.C. 154(b) by 1427 days.

(21) Appl. No.: 14/314,032

(22) Filed: Jun. 25, 2014

(65) Prior Publication Data

US 2015/0379073 A1     Dec. 31, 2015

(51) Int. Cl.
*G06F 17/00* (2019.01)
*G06F 16/2453* (2019.01)
*G06F 16/22* (2019.01)

(52) U.S. Cl.
CPC ...... *G06F 16/2453* (2019.01); *G06F 16/2237* (2019.01)

(58) Field of Classification Search
CPC ......... G06F 17/30501; G06F 17/30315; G06F 16/2453; G06F 16/2237
USPC ........................................ 707/693, 695, 715
See application file for complete search history.

(56) References Cited

U.S. PATENT DOCUMENTS

| | | | |
|---|---|---|---|
| 5,159,647 A | 10/1992 | Burt | |
| 5,278,783 A * | 1/1994 | Edmondson | G06F 7/508 708/711 |
| 5,918,225 A | 6/1999 | White et al. | |
| 7,168,025 B1 | 1/2007 | Berkovich | |
| 7,580,927 B1 * | 8/2009 | Abugov | G06F 17/30271 |
| 7,868,789 B1 | 1/2011 | Binnig et al. | |
| 8,032,499 B2 | 10/2011 | Faerber et al. | |
| 8,046,377 B2 | 10/2011 | Steinau et al. | |
| 8,126,855 B2 | 2/2012 | Faerber et al. | |
| 8,326,810 B2 | 12/2012 | Faerber et al. | |
| 8,392,382 B2 * | 3/2013 | Marwah | G06F 17/30377 707/607 |
| 8,442,988 B2 | 5/2013 | Draese et al. | |
| 8,452,737 B2 | 5/2013 | Netz et al. | |
| 2002/0075714 A1 * | 6/2002 | Pereira | G06F 17/30982 365/49.1 |
| 2003/0086620 A1 | 5/2003 | Lucco | |
| 2004/0078461 A1 * | 4/2004 | Bendich | G06F 11/3495 709/224 |
| 2004/0186706 A1 * | 9/2004 | Itoh | G06F 17/271 704/10 |
| 2006/0074977 A1 * | 4/2006 | Kothuri | G06F 17/30327 |

(Continued)

*Primary Examiner* — Tyler J Torgrimson
(74) *Attorney, Agent, or Firm* — Buckley, Maschoff & Talwalkar LLC

(57) ABSTRACT

An attribute vector including value identifiers and corresponding to a dictionary structure is identified. A dictionary type encoding structure is generated by virtually partitioning the dictionary structure. The dictionary type encoding structure may include multiple dictionary types. Based on the dictionary encoding structure, the attribute vector may be split to generate multiple attribute vector blocks that may be identified by block transition indices. Based on the dictionary types in the dictionary encoding structure, the value identifiers in the attribute vector blocks are rearranged. Such a rearrangement optimizes the attribute vector for searching the value identifiers.

17 Claims, 14 Drawing Sheets

(56) References Cited

U.S. PATENT DOCUMENTS

| | | | |
|---|---|---|---|
| 2007/0109155 A1* | 5/2007 | Fallon | G06T 9/00 341/50 |
| 2007/0130140 A1* | 6/2007 | Cytron | G06F 17/30985 |
| 2008/0050025 A1* | 2/2008 | Bashyam | G06T 9/002 382/238 |
| 2008/0294863 A1* | 11/2008 | Faerber | H03M 7/3084 711/170 |
| 2009/0006399 A1 | 1/2009 | Raman et al. | |
| 2010/0030796 A1* | 2/2010 | Netz | G06F 17/30501 707/756 |
| 2010/0281004 A1* | 11/2010 | Kapoor | G06F 17/30501 707/693 |
| 2010/0299316 A1* | 11/2010 | Faerber | H03M 7/3084 707/693 |
| 2011/0313980 A1* | 12/2011 | Faerber | H03M 7/30 707/693 |
| 2012/0054225 A1* | 3/2012 | Marwah | G06F 17/30477 707/769 |
| 2012/0117064 A1* | 5/2012 | Draese | G06F 17/30592 707/737 |
| 2012/0221528 A1 | 8/2012 | Renkes et al. | |
| 2013/0033389 A1 | 2/2013 | Bendel et al. | |
| 2013/0151491 A1* | 6/2013 | Gislason | G06F 17/30563 707/696 |
| 2013/0166566 A1 | 6/2013 | Lemke et al. | |
| 2013/0232176 A1 | 9/2013 | Plattner et al. | |
| 2014/0122452 A1 | 5/2014 | Faerber et al. | |
| 2014/0279959 A1* | 9/2014 | Marwah | G06F 17/30489 707/693 |
| 2015/0278268 A1* | 10/2015 | El-Ali | G06F 17/30324 707/722 |
| 2015/0347087 A1* | 12/2015 | Dickie | G06F 7/36 707/753 |

* cited by examiner

TABLE 105

| JAN | INTEL | RED | € 1 |
| FEB | ABB | GREEN | € 2 |
| MAR | HP | BLUE | € 2 |
| APR | INTEL | RED | € 4 |
| MAY | IBM | WHITE | € 5 |
| JUN | IBM | BLACK | € 5 |
| JUL | SIEMENS | BROWN | € 4 |
| AUG | INTEL | BLUE | € 3 |
| ... | ... | ... | ... |

COLUMN 115

120

| VALUEID | VALUE |
| --- | --- |
| 1 | ABB |
| 2 | HP |
| 3 | IBM |
| 4 | INTEL |
| 5 | SIEMENS |

DICTIONARY 110

FIG. 1

| INDEX 305 | CUSTOMER NAME 310 | COUNTRY 315 | TRANSACTION 320 | AMOUNT (IN USD) 325 |
|---|---|---|---|---|
| I1 | Mendis | Australia | Credit | 5000 |
| I2 | Amir | China | Debit | 12000 |
| I3 | Elena | Germany | Debit | 6000 |
| I4 | David | India | Debit | 17000 |
| I5 | Kevin | Finland | Debit | 18000 |
| I6 | David | Germany | Credit | 13000 |
| I7 | Ana | India | Credit | 14000 |
| I8 | Joseph | Finland | Credit | 16000 |
| I9 | Ana | Australia | Credit | 17000 |
| I10 | Amir | China | Credit | 17000 |
| I11 | Amir | China | Credit | 14000 |
| I12 | Mendis | Germany | Credit | 13000 |
| I13 | Kevin | Australia | Debit | 13000 |
| I14 | Elena | India | Debit | 11000 |
| I15 | Ana | Australia | Debit | 16000 |
| I16 | Joseph | Germany | Credit | 17000 |
| I17 | Elena | India | Credit | 18000 |
| I18 | Amir | China | Credit | 22000 |

TABLE 1

FIG. 3

DICTIONARY STRUCTURE FOR COUNTRY

| VALUEIDS | COUNTRY |
|---|---|
| 1 | Australia |
| 2 | China |
| 3 | Germany |
| 4 | India |
| 5 | Finland |

VALUEIDS 415    COUNTRY 420

TABLE 3

DICTIONARY STRUCTURE FOR CUSTOMER NAME

| VALUEIDS | CUSTOMER NAME |
|---|---|
| 1 | Ana |
| 2 | Amir |
| 3 | David |
| 4 | Elena |
| 5 | Joseph |
| 6 | Kevin |
| 7 | Mendis |

VALUEIDS 405    CUSTOMER NAME 410

TABLE 2

FIG. 4

| INDEX | CUSTOMER NAME | COUNTRY | TRANSACTION | AMOUNT (IN USD) |
|---|---|---|---|---|
| I1 | 7 | 1 | Credit | 5000 |
| I2 | 2 | 2 | Debit | 12000 |
| I3 | 4 | 3 | Debit | 6000 |
| I4 | 3 | 4 | Debit | 17000 |
| I5 | 6 | 5 | Debit | 18000 |
| I6 | 3 | 3 | Credit | 13000 |
| I7 | 1 | 4 | Credit | 14000 |
| I8 | 5 | 5 | Credit | 16000 |
| I9 | 1 | 1 | Credit | 17000 |
| I10 | 2 | 2 | Credit | 17000 |
| I11 | 2 | 2 | Credit | 14000 |
| I12 | 7 | 3 | Credit | 13000 |
| I13 | 6 | 1 | Debit | 13000 |
| I14 | 4 | 4 | Debit | 11000 |
| I15 | 1 | 1 | Debit | 16000 |
| I16 | 5 | 3 | Credit | 17000 |
| I17 | 4 | 4 | Credit | 18000 |
| I18 | 2 | 2 | Credit | 22000 |

INDEX 505  CUSTOMER NAME 510  COUNTRY 515  TRANSACTION 520  AMOUNT 525

TABLE 4

FIG. 5

TABLE 5

DTE STRUCTURE FOR COUNTRY

| DICTIONARY TYPE | START INDEX | END INDEX |
|---|---|---|
| 0 | 1 | 2 |
| 1 | 3 | 5 |

DICTIONARY TYPE 605 — START INDEX 610 — END INDEX 615

TABLE 6

BTI STRUCTURE FOR COUNTRY

| DICTIONARY TYPE | BLOCK TRANSITION START INDEX | BLOCK TRANSITION END INDEX |
|---|---|---|
| 0 | I11 | I18 |
| 1 | I1 | I10 |

DICTIONARY TYPE 620 — BLOCK TRANSITION START INDEX 625 — BLOCK TRANSITION END INDEX 630

FIG. 6

| INDEX | COUNTRY | REARRANGED ATTRIBUTE VECTOR FOR COUNTRY | REARRANGED ATTRIBUTE VECTOR FOR CUSTOMER NAME BASED ON DTE STRUCTURE FOR COUNTRY | CUSTOMER NAME |
|---|---|---|---|---|
| I1 | 1 | 4 | 4 | 7 |
| I2 | 2 | 3 | 5 | 2 |
| I3 | 3 | 3 | 4 | 4 |
| I4 | 4 | 4 | 3 | 3 |
| I5 | 5 | 5 | 6 | 6 |
| I6 | 3 | 3 | 3 | 3 |
| I7 | 4 | 4 | 1 | 1 |
| I8 | 5 | 5 | 5 | 5 |
| I9 | 1 | 4 | 4 | 1 |
| I10 | 2 | 3 | 7 | 2 |
| I11 | 2 | 2 | 2 | 2 |
| I12 | 3 | 2 | 2 | 7 |
| I13 | 1 | 1 | 6 | 6 |
| I14 | 4 | 1 | 1 | 4 |
| I15 | 1 | 1 | 1 | 1 |
| I16 | 3 | 2 | 2 | 5 |
| I17 | 4 | 1 | 7 | 4 |
| I18 | 2 | 2 | 2 | 2 |

INDEX 705 — COUNTRY 710 — REARRANGED ATTRIBUTE VECTOR FOR COUNTRY 715 — REARRANGED ATTRIBUTE VECTOR FOR CUSTOMER BASED ON DTE STRUCTURE FOR COUNTRY 720 — CUSTOMER NAME 725

TABLE 7

FIG. 7

DTE STRUCTURE OF CUSTOMER NAME

| DICTIONARY TYPE | START INDEX | END INDEX |
|---|---|---|
| 0 | 1 | 3 |
| 1 | 4 | 7 |

DICTIONARY TYPE 805 · START INDEX 810 · END INDEX 815

TABLE 8

FIG. 8

| INDEX | REARRANGED ATTRIBUTE VECTOR FOR COUNTRY | REARRANGED ATTRIBUTE VECTOR FOR COUNTRY BASED ON DTE STRUCTURE FOR CUSTOMER NAME | REARRANGED ATTRIBUTE VECTOR FOR CUSTOMER NAME BASED ON DTE STRUCTURE FOR CUSTOMER NAME | REARRANGED ATTRIBUTE VECTOR FOR CUSTOMER NAME BASED ON DTE STRUCTURE FOR COUNTRY |
|---|---|---|---|---|
| I1 | 4 | 4 | 4 | 4 |
| I2 | 3 | 3 | 5 | 5 |
| I3 | 3 | 3 | 4 | 4 |
| I4 | 4 | 3 | 7 | 3 |
| I5 | 5 | 5 | 6 | 6 |
| I6 | 3 | 4 | 4 | 3 |
| I7 | 4 | 5 | 5 | 1 |
| I8 | 5 | 4 | 1 | 5 |
| I9 | 4 | 3 | 3 | 4 |
| I10 | 3 | 4 | 3 | 7 |
| I11 | 2 | 2 | 2 | 2 |
| I12 | 2 | 2 | 2 | 2 |
| I13 | 1 | 1 | 6 | 6 |
| I14 | 1 | 1 | 1 | 1 |
| I15 | 1 | 1 | 1 | 1 |
| I16 | 2 | 2 | 2 | 2 |
| I17 | 1 | 1 | 7 | 7 |
| I18 | 2 | 2 | 2 | 2 |

INDEX 905  
REARRANGED ATTRIBUTE VECTOR FOR COUNTRY 910  
REARRANGED ATTRUBITE VECTOR FOR COUNTRY BASED ON DTE STRUCTURE FOR CUSTOMER NAME 915  
REARRANGED ATTRIBUTE VECTOR FOR CUSTOMER NAME BASED ON DTE STRUCTURE FOR CUSTOMER NAME 920  
REARRANGED ATTRIBUTE VECTOR FOR CUSTOMER NAME BASED ON DTE STRUCTURE FOR COUNTRY 925

TABLE 9

FIG. 9

TABLE 10

DTE STRUCTURE OF PRODUCT SALES

| DICTIONARY TYPE | START INDEX | END INDEX |
|---|---|---|
| 0 | 1 unit | 10 units |
| 1 | 11 units | 25 units |

DICTIONARY TYPE 1005  START INDEX 1010  END INDEX 1015

TABLE 11

DTE STRUCTURE OF TEMPERATURE

| DICTIONARY TYPE | START INDEX | END INDEX |
|---|---|---|
| 0 | 0 | 30.5 |
| 1 | 30.6 | 45 |

DICTIONARY TYPE 1020  START INDEX 1025  END INDEX 1030

TABLE 12

DTE STRUCTURE FOR NAME

| DICTIONARY TYPE | START INDEX | END INDEX |
|---|---|---|
| 0 | 1 | 2 |
| 1 | 3 | 4 |
| 2 | 4 | 5 |
| 3 | 6 | 7 |

DICTIONARY TYPE 1035  START INDEX 1040  END INDEX 1045

FIG. 10

TABLE 13
DTE STRUCTURE OF ATTRIBUTE VECTOR 'A'

| DICTIONARY TYPE | START INDEX | END INDEX |
|---|---|---|
| 0 | 0 | 4000 |
| 1 | 4001 | 1000000 |

DICTIONARY TYPE 1205, START INDEX 1210, END INDEX 1215

TABLE 14
BTI STRUCTURE FOR ATTRIBUTE VECTOR 'A'

| DICTIONARY TYPE | BLOCK TRANSITION START INDEX | BLOCK TRANSITION END INDEX |
|---|---|---|
| 0 | 0 | 54000000 |
| 1 | 54000001 | 1000000000 |

DICTIONARY TYPE 1220, BLOCK TRANSITION START INDEX 1225, BLOCK TRANSITION END INDEX 1230

TABLE 15
DTE STRUCTURE OF ATTRIBUTE VECTOR 'B'

| DICTIONARY TYPE | START INDEX | END INDEX |
|---|---|---|
| 0 | 0 | 2000 |
| 1 | 2001 | 10000 |

DICTIONARY TYPE 1235, START INDEX 1240, END INDEX 1245

TABLE 16
BTI STRUCTURE FOR ATTRIBUTE VECTOR 'B'

| DICTIONARY TYPE | BLOCK TRANSITION START INDEX | BLOCK TRANSITION END INDEX |
|---|---|---|
| 0 | 0 | 34000000 |
| 1 | 34000001 | 540000000 |
| 0 | 540000001 | 730000063 |
| 1 | 730000064 | 1000000000 |

DICTIONARY TYPE 1250, BLOCK TRANSITION START INDEX 1255, BLOCK TRANSITION END INDEX 1260

VIRTUAL SPLIT DICTIONARY FOR SEARCH OPTIMIZATION

BACKGROUND

Advancements in database technologies have provided efficient means of data storage. For instance, a dataset including values may be stored in a table residing in the database in compressed form, and may be associated with identifiers. The values of the dataset may be accessed through the identifiers. For instance, when the dataset is searched for a specific value, a database search engine may first identify the identifier associated with the value. Upon such identification, the database search engine may search for the corresponding identifier through the entire dataset in the table. As the database search engine has to search through the entire dataset of the table, the search process may become inefficient and time consuming. Although compression of data improves the storage efficiency, searching optimally for data may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 1 is a block diagram illustrating a table of structured data, and a dictionary for a column of a table, according to an embodiment.

FIG. 3 is a block diagram exemplarily illustrating a table residing in a data store, according to an embodiment.

FIG. 4 is a block diagram exemplarily illustrating tables residing in a data store, according to an embodiment.

FIG. 5 is a block diagram exemplarily illustrating a table residing in a data store, according to an embodiment.

FIG. 6 is a block diagram exemplarily illustrating tables residing in a data store according to an embodiment.

FIG. 7 is a block diagram exemplarily illustrating a table residing in a data store, according to an embodiment.

FIG. 8 is a block diagram exemplarily illustrating a table, according to an embodiment.

FIG. 9 is an exemplary illustration of a table residing in a data store, according to an embodiment.

FIG. 10 is a block diagram exemplarily illustrating tables residing in a data store, according to an embodiment.

FIG. 12 is a block diagram exemplarily illustrating tables residing in a data store, according to an embodiment.

DETAILED DESCRIPTION

Figure 2:
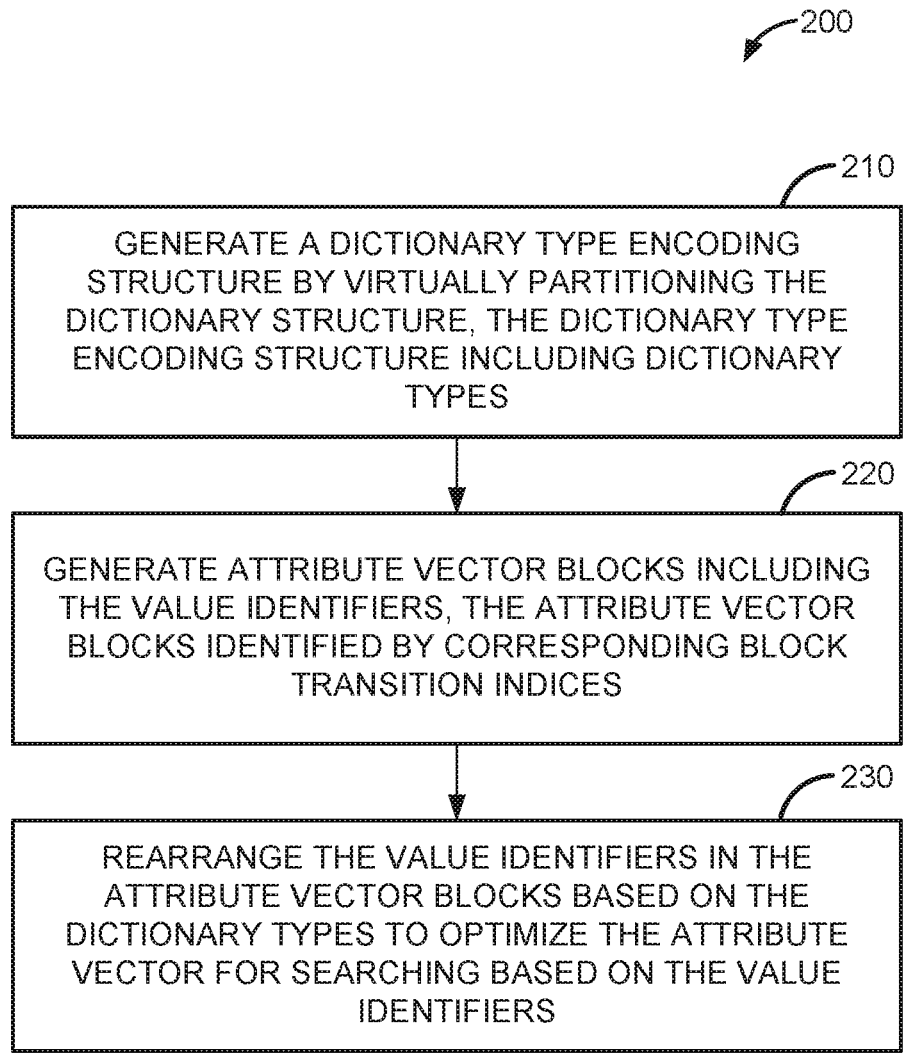
FIG. 2 is a flow diagram illustrating a process for optimizing search in an attribute vector, according to an embodiment.

Embodiments of techniques related to virtually split a dictionary for search optimization are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Volume of business data associated with an enterprise may witness an exponential surge as a function of time. Such business data may be stored in multiple data stores that may be centrally accessed over a network by systems and applications in the enterprise. The business data may correspond to structured and unstructured data, transactional data, data related to business processes, etc. Such business data may reside in data structures (e.g. tables, flat files, etc.) in data stores. Data store may include an in-memory database, a web-based database, a conventional database, etc. The in-memory database may include a main memory and an underlying hardware for executing storage and computational operations. Typically, business data required for processing may be available in the main memory; and operations such as computations and memory-reads may be executed in the main memory.

In an embodiment, a table in a database may be represented by a two dimensional data structure with cells organized in rows and columns. For example, the business data in the in-memory database may be stored as a row store or a column store. In the row store, the fields of every row are stored sequentially, while in the column store, the fields of every column are stored in contiguous memory locations.

In an embodiment, row based storage and column based storage store data that can be modeled and accessed by various components of the in-memory management system, such as front-end development application, database application, a query processing engine, etc. In column based storage, values associated with business data may be stored as columns in contiguous memory locations. These stored values may be intrinsically sorted to place several contiguous values adjacent to each other. Various compression techniques, such as run-length encoding, cluster coding, dictionary coding, etc., may be used on these contiguous values. Compression may have advantages, such as, reduced data volumes may require less installed main memory or hard disk capacity, and reduced data flows may place lower demands on processor architectures, network bandwidth, etc.

FIG. 1 is a block diagram illustrating a table of structured data, and a dictionary for a column of the table, according to an embodiment. By way of illustration, FIG. 1 shows column 115 in table 105 that may be provided with a dictionary that specifies value identifiers (ValueIds) 120 for the values in the column 115. In an embodiment, dictionary 110 may be used to provide dictionary-based compression to reduce an amount of data stored in table 105. Dictionary 110 includes values represented by value identifiers 120. Typically dictionary 110 may represent a list of sorted values, as appearing in column 115 and value identifiers 120.

In an embodiment, to reduce the memory occupied by column 115 of table 105 using a dictionary-based compression method, a sorted list of different values appearing in column 115 may be generated and the different values may be numbered. The numbers (e.g., integers) may be used as placeholders for the values in table 105. The largest numbers needed to represent the values may be noted. Consider a cardinality 'C' of a column is defined to be the number of different values appearing in it, and the total length of the column is 'N.' When the value of 'C' is much less than 'N', dictionary-based compression may bring benefits, such as reduced memory consumption in contrast to storing of the values in the table. A sorted list of 'C' values may be referred to as a dictionary structure and may be used to look up the values of the numbers appearing in the table whenever these values need to be determined.

By way of example, table 105 includes column 115, which has values such as INTEL, ABB, HP, etc. Dictionary 110 includes value identifiers 120 that represent the different values existing in column 115. Values of column 115 of table 105 may be replaced with the value identifiers 120, which may reduce memory footprint of the data represented by the column. Value identifiers 120 in the new table, along with the dictionary 110 may be used to reconstruct the values of column 115.

In an embodiment, a mechanism of searching data in a database/table may be optimized by rearranging the ValueIds in a column of the table. Such a column of the table may be referred to as an attribute vector. A dictionary structure associated with the attribute vector may be identified and virtually split to generate or create dictionary type encoding (DTE) structure. The DTE structure may include dictionary types, based on which the attribute vector may be split into attribute vector blocks. The ValueIds in the attribute vector blocks may be rearranged based on the dictionary types in the DTE structure. Such a rearrangement may optimize the attribute vector to search for data in the attribute vector.

FIG. 2 is a flow diagram illustrating process 200 for optimizing search in an attribute vector, according to an embodiment. Process 200, upon execution, provides a mechanism to optimize an attribute vector to search for data in the attribute vector. The columns of a table may include dictionary-based compression values and may be based on a dictionary structure in a database. Such a column may also be referred to as the attribute vector that may include business data and have a dictionary structure associated with it.

In an embodiment, a mechanism to search for data in the attribute vector may be optimized by virtually partitioning the dictionary structure associated with the attribute vector. Virtual partitioning may refer to partitioning the dictionary structure virtually, thereby preserving the original dictionary structure. If 'S' corresponds to number of virtual splits, then the number of virtual partitions created would correspond to 'S+1.' For example, a single virtual spilt on the dictionary structure may create or generate two virtual partitions of the dictionary structure; two virtual splits on the dictionary structure may create three virtual partitions of the dictionary structure and so on.

FIG. 3 is a block diagram exemplarily illustrating a table residing in a data store, according to an embodiment. By way of illustration, FIG. 3 shows Table 1 that includes transaction records of customers of a bank ABC Corp. In an embodiment, Table 1 includes structured business data corresponding to transactions made by customers in different countries. The columns of Table 1 corresponds to attributes, such as, "INDEX" 305, "CUSTOMER NAME" 310, "COUNTRY" 315, "TRANSACTION" 320, "AMOUNT (IN USD)" 325, etc. Attribute values of columns may have data dependencies across a same row of the table. For example, consider row with index I1 in Table 1. "CUSTOMER NAME" including attribute value "Mendis" has data dependencies on column "COUNTRY" including attribute value "Australia"; column "TRANSACTION" including attribute value "Credit" and column "AMOUNT (IN USD)" including attribute value "5000." In an embodiment, the business objects may include business data, which may be modeled as sets of joined tables. The column "INDEX" 305 includes indices indicating memory offsets or memory addresses. The indices are static, that is, the memory offsets or memory addresses are not modified when the rows are interchanged. By way of example, consider the attribute values in the rows with indices I1 and I2 are interchanged. Upon interchanging, the values in the columns "CUSTOMER NAME" 310, "COUNTRY" 315, "TRANSACTION" 320 and "AMOUNT (IN USD)" 325 may be interchanged, but the values in the column "INDEX" 305 remains constant.

FIG. 4 is a block diagram exemplarily illustrating tables residing in a data store, according to an embodiment. By way of illustration. FIG. 4 shows Table 2 and Table 3 that respectively represent a dictionary structure for "CUSTOMER NAME" and "COUNTRY". Table 2 and Table 3 show the dictionary-compressed ValueIds 405 and 415 corresponding to the values in the columns "CUSTOMER NAME" 410 and "COUNTRY" 420.

FIG. 5 is a block diagram exemplarily illustrating a table residing in a data store, according to an embodiment. By way of illustration, FIG. 5 shows Table 4 exemplarily illustrating columns "CUSTOMER NAME" 310 and "COUNTRY" 315 of Table 1 (as shown in FIG. 3) including dictionary-based compressed values. That is, the columns include identifiers of the values (e.g., ValueIds) instead of the actual values. The columns 510 and 515 of Table 4 in FIG. 5 include dictionary-based compressed ValueIds based on dictionary structures corresponding to Table 2 and Table 3 of FIG. 4.

In an embodiment, the columns of Table 4 correspond to "INDEX" 505, "CUSTOMER NAME" 510, "COUNTRY" 515, "TRANSACTION" 520 and "AMOUNT (IN USD)" 525. The columns "COUNTRY" 515, "TRANSACTION" 520 including such ValueIds may also be referred to as "attribute vectors" that store the ValueIds instead of actual values. The attribute vectors "CUSTOMER NAME" 510 and "COUNTRY" 515 of Table 4 may be optimized for searching data by rearranging the ValueIds based on business logic. By way of example, the dictionary structures (e.g., Table 2 and Table 3 as shown in FIG. 4) may be virtually partitioned (or virtually split) to generate corresponding dictionary type encoding (DTE) structures. Based on the DTE structures, the attribute vectors "CUSTOMER NAME" 510 and "COUNTRY" 515 may be split into multiple attribute vector blocks and the ValueIds in the corresponding attribute vector blocks be rearranged to optimize the attribute vectors for searching data.

Referring back to FIG. 2, consider, at 210, generating or creating a DTE structure by virtually partitioning the associated dictionary structure, such that the attribute vector is split into nearly equal percentage of attribute vector blocks. By way of example, in Table 4 (as shown in FIG. 5), the attribute vector "COUNTRY" 515 includes 18 records indicated by the respective indices 505 (e.g., I1-I18). The number of records (e.g., count) including ValueIds '1' and '2' is 8 (e.g. records/rows with indices I1, I2, I9, I10, I11, I13, I15, and I18) and the number of records including ValueIds '3', '4' and '5' (e.g., I3-I8, I12, I14, I16 and I17) is 10. Since the attribute vector "COUNTRY" 515 may be split into nearly equal percentage of attribute vector blocks, it may be determined that the corresponding DTE structure may be defined such that ValueIds '1' and '2' correspond one dictionary type (e.g., first dictionary type) and ValueIds '3', '4', and '5' correspond another dictionary type (e.g., second dictionary type). Hence the corresponding DTE structure may be generated.

FIG. 6 is a block diagram exemplarily illustrating tables residing in a data store according to an embodiment. By way of illustration, Table 5 shows the "DTE STRUCTURE FOR COUNTRY" that includes data structures to store "DICTIONARY TYPE" 605, "START INDEX" 610 and "END INDEX" 615 corresponding to each dictionary type. The "DTE STRUCTURE FOR COUNTRY" includes two types of dictionaries. By way of example, the types of dictionaries, hereinafter referred to as 'dictionary types,' may include dictionary type '0' and dictionary type '1' and may also be referred to as "major dictionary type" and "minor dictionary type" respectively. The "START INDEX" and "END INDEX" corresponding to the major dictionary type and the minor dictionary type indicate a range of ValueIds for corresponding dictionary types. By way of example, Table 5 shows that the "START INDEX" 610 and "END INDEX" 615 corresponding to major dictionary type as '1' and '2' respectively and the corresponding indices for minor dictionary type as '3' and '5' (e.g., ValueIds 3, 4, 5 correspond to minor dictionary type) respectively. The "DTE STRUCTURE FOR COUNTRY" represented by Table 5 may correspond to two virtual partitions that are created on the dictionary structure, namely Table 3 (as shown in FIG. 4).

Referring back to FIG. 2, upon generating the DTE structure for the attribute vector "COUNTRY," the attribute vector "COUNTRY" 515 of Table 4 (as shown in FIG. 5) may be split to generate multiple attribute vector blocks, at 220. As discussed previously, since the "DTE STRUCTURE FOR COUNTRY" includes two dictionary types (e.g., major dictionary type and minor dictionary type), the attribute vector "COUNTRY" 515 (of Table 4 in FIG. 5) may be split into two equally sized attribute vector blocks (e.g., first attribute vector block and second attribute vector block). By way of example, the first attribute vector block may correspond to records/rows indicated by indices I11 to I18 and the second attribute vector block may correspond to records/rows indicated by indices I1 to I10.

In an embodiment, the attribute vector blocks may represent blocks including data (e.g., ValueIds) and may be identified by block transition indices (BTIs). The BTIs may be represented by BTI structures that may include data structures to store "Dictionary Type", "Block Transition Start Index" and "Block Transition End Index." As discussed previously, the attribute vector "COUNTRY" 515 may be split into two equally sized attribute vector blocks represented by first attribute vector block and second attribute vector block. By way of example, since the first attribute vector block may correspond to records/rows indicated by indices I11 to I18 and the second attribute vector block may correspond to records/rows indicated by indices I1 to I10, the BTI structure for attribute vector "COUNTRY" may be generated or determined.

By way of illustration, Table 6 in FIG. 6 shows the "BTI STRUCTURE FOR COUNTRY" including "DICTIONARY TYPE" 620, "BLOCK TRANSITION START INDEX" 625 and "BLOCK TRANSITION END INDEX" 630. The values in "BLOCK TRANSITION START INDEX" 625 and "BLOCK TRANSITION END INDEX" 630 for "DICTIONARY TYPE" 620 '0' and '1' may represent memory addresses or memory offsets of the corresponding attribute vector blocks. For example, the first attribute vector block corresponding to the major dictionary type and the second attribute vector block corresponding to the minor dictionary type have start indices and end indices as shown in Table 6. In an embodiment, the block transition start index and the block transition end index may correspond to the start indices and end indices of the attribute vector blocks, thereby indicating BTIs.

In an embodiment, the ValueIds in the attribute vector blocks may be rearranged based on business logic. For instance, the business logic may include rearranging the ValueIds in the first attribute vector block based on the definition of the major dictionary type and the ValueIds in the second attribute vector block based on the definition of the minor dictionary type. Referring to FIG. 5, consider attribute vectors "COUNTRY" 515 and "CUSTOMER NAME" 510 of Table 4 are optimized for searching data. For further explanation and illustrative purposes, only attribute vectors "COUNTRY" 515 and "CUSTOMER NAME" 510 of Table 4 will be considered.

FIG. 7 is a block diagram exemplarily illustrating a table residing in a data store, according to an embodiment. By way of illustration. FIG. 7 shows Table 7 including "INDEX" 705 and the dictionary-compressed values for attribute vectors "COUNTRY" 710 and "CUSTOMER NAME" 725.

Referring back to FIG. 2, at 230, the ValueIds in the attribute vector "COUNTRY" 710 of Table 7 (as shown in FIG. 7) may be rearranged based on the definitions in the DTE structure of Table 5 (as shown in FIG. 6). In an embodiment, rearranging the ValueIds in the attribute vector may include swapping the ValueIds between the attribute vector blocks (e.g., between first attribute vector block and second attribute vector block) based on the number of dictionary types in the DTE structure. As explained previously, the first attribute vector block corresponding to the definition of major dictionary type and the second attribute vector block corresponding to the definition of minor dictionary type. By way of example, consider the ValueIds between the first attribute vector block and the second attribute vector blocks may be rearranged as follows.

ValueId 1 (in the first attribute vector block; indicated by index I1 in the attribute vector "COUNTRY" 710 of Table 7) may be swapped with ValueId 4 (in the second attribute vector block; indicated by index I117 in the attribute vector "COUNTRY" 710 of Table 7).

ValueId 2 (in the first attribute vector block; indicated by index I2 in the attribute vector "COUNTRY" 710 of Table 7) may be swapped with ValueId 3 (in the second attribute vector block; indicated by index I16 in the attribute vector "COUNTRY" 710 of Table 7).

ValueId 1 (in the first attribute vector block; indicated by index I9 in the attribute vector "COUNTRY" 710 of Table 7) may be swapped with ValueId 4 (in the second attribute vector block; indicated by index I14 in the attribute vector "COUNTRY" 710 of Table 7).

ValueId 2 (in the first attribute vector block; indicated by index I10 in the attribute vector "COUNTRY" 710 of Table 7) may be swapped with ValueId 3 (in the second attribute vector block; indicated by index I12 in the attribute vector "COUNTRY" 710 of Table 7), and so on.

In an embodiment, upon rearranging the ValueIds in the first attribute vector block and the second attribute vector block based on the definitions in the DTE structure Table 5 (as shown in FIG. 6), the attribute vector "REARRANGED ATTRIBUTE VECTOR FOR COUNTRY" 715 of Table 7 may be generated. Since the ValueIds of the attribute vector "COUNTRY" 710 have data dependencies across a same row (e.g., attribute vector "CUSTOMER NAME" 725) in Table 7 (as shown in FIG. 7), the ValueIds in the attribute vector attribute vector "CUSTOMER NAME" 725 of Table 7 may also be rearranged to maintain row integrity of data dependencies. The attribute vector "REARRANGED ATTRIBUTE VECTOR FOR CUSTOMER NAME BASED ON DTE STRUCTURE FOR COUNTRY" 720 in Table 7 exemplarily illustrates such a rearrangement.

In an embodiment, upon rearranging the ValueIds in the attribute vector blocks as explained above, a transition point between the attribute vector blocks may be identified, By way of example, in Table 7, in the attribute vector "REARRANGED ATTRIBUTE VECTOR FOR COUNTRY" with ValueId '2' corresponds to index I11 that belongs to minor dictionary type. The index I11 therefore indicates a transition between the dictionary types and may herein be referred to as transition index or a transition point. Since the attribute vector blocks are split based on the dictionary types, the transition point may indicate a point of transition between the attribute vector blocks. The transition index may correspond to a point between the attribute vector blocks. As explained previously, Table 6 of FIG. 6 shows the attribute vector blocks that may be identified by the indices, namely, "BLOCK TRANSITION START INDEX" 625 and "BLOCK TRANSITION END INDEX" 630. Since the attribute vector "COUNTRY" 710 was optimized based on the DTE structure of "COUNTRY" (Table 5 as shown in FIG. 6) and the transition point was identified, the attribute vector "CUSTOMER NAME" 725 may be optimized by rearranging the ValueIds within the transition index or transition point to generate the attribute vector "REARRANGED ATTRIBUTE VECTOR FOR CUSTOMER NAME BASED ON DTE STRUCTURE FOR COUNTRY" 720.

In an embodiment, to optimize the attribute vector "CUSTOMER NAME" 510 (of Table 4 as shown in FIG. 5) for searching data, a corresponding DTE structure may be generated by virtually partitioning the associated dictionary structure, such that the attribute vector is split into nearly equal percentage of attribute vector blocks.

FIG. 8 is a block diagram exemplarily illustrating a table, according to an embodiment. By way of illustration, Table 8 shows "DTE STRUCTURE FOR CUSTOMER NAME", including data structures to store "DICTIONARY TYPE" 805; and "START INDEX" 810 and "END INDEX" 815 corresponding to each dictionary type. The "DTE STRUCTURE FOR CUSTOMER NAME" includes two types of dictionaries with respective the "start index" 810 and "end index" 815 including ValueIds '1' and '3' (e.g., ValueIds '1', '2' and '3') for major dictionary and ValueIds '4' and '7' (e.g., ValueIds '4', '5', '6' and '7') for minor dictionary type. The DTE structure of Table 8 may represent two virtual partitions created on the dictionary structure of Table 2.

In an embodiment, the DTE structure of Table 8 represents two virtual partitions created on the dictionary structure (e.g., Table 3 as shown in FIG. 4), and may correspond to a single split on the dictionary structure. In an embodiment, the number of virtual partitions on the dictionary structure may be created based on business logic (e.g., occurrence of values represented by the ValueIds in the attribute vector; and/or prospective optimization for searching data: and/or memory available for generating DTE and BTI structures). Based on such identification, dictionary types including ValueIds for "Start Index" and "End Index" may be defined and the corresponding DTE structures may be generated.

FIG. 9 is an exemplary illustration of a table residing in a data store, according to an embodiment. By way of illustration, FIG. 9 shows Table 9 including "INDEX" 905, attribute vectors "REARRANGED ATTRIBUTE VECTOR FOR COUNTRY" 910 and "REARRANGED ATTRIBUTE VECTOR FOR NAME BASED ON DTE STRUCTURE FOR COUNTRY" 925.

In an embodiment, the ValueIds in the attribute vector "REARRANGED ATTRIBUTE VECTOR FOR CUSTOMER NAME BASED ON DTE STRUCTURE FOR COUNTRY" 925 of Table 9 may be rearranged based on the "DTE STRUCTURE OF CUSTOMER NAME" of Table 8 (as shown in FIG. 8). As described previously, the transition index or transition point may indicate a point of transition between the attribute vector blocks.

For Table 9 shown in FIG. 9, the ValueIds corresponding to indices I1 to I10 in the attribute vector "REARRANGED ATTRIBUTE VECTOR FOR CUSTOMER NAME BASED ON DTE STRUCTURE FOR COUNTRY" 925 are rearranged based on the DTE structure of Table 8 (as shown in FIG. 8). By way of example, the ValueIds corresponding to indices I11 to I10 in the attribute vector "REARRANGED ATTRIBUTE VECTOR FOR CUSTOMER NAME BASED ON DTE STRUCTURE FOR COUNTRY" may be rearranged as follows.

ValueId 3 (indicated by index I4 in the attribute vector "REARRANGED ATTRIBUTE VECTOR FOR CUSTOMER NAME BASED ON DTE STRUCTURE FOR COUNTRY" 925 of Table 9) may be swapped with ValueId 7 (indicated by index I10 in the attribute vector "REARRANGED ATTRIBUTE VECTOR FOR CUSTOMER NAME BASED ON DTE STRUCTURE FOR COUNTRY" 925 of Table 9).

ValueId 3 (indicated by index I6 corresponding to the attribute vector "REARRANGED ATTRIBUTE VECTOR FOR CUSTOMER NAME BASED ON DTE STRUCTURE FOR COUNTRY" 925 of Table 9) may be swapped with ValueId 3 (indicated by index I9 corresponding to the attribute vector "REARRANGED ATTRIBUTE VECTOR FOR CUSTOMER NAME BASED ON DTE STRUCTURE FOR COUNTRY" 925 of Table 9).

ValueId 1 (indicated by index I7 corresponding to the attribute vector "REARRANGED ATTRIBUTE VECTOR FOR CUSTOMER NAME BASED ON DTE STRUCTURE FOR COUNTRY" 925 of Table 9) may be swapped with ValueId 5 (indicated by index I8 corresponding to the attribute vector "REARRANGED ATTRIBUTE VECTOR FOR CUSTOMER NAME BASED ON DTE STRUCTURE FOR COUNTRY" 925 of Table 9).

In an embodiment, upon the above rearrangement, the attribute vector "REARRANGED ATTRIBUTE VECTOR FOR CUSTOMER NAME BASED ON DTE STRUCTURE FOR CUSTOMER NAME" 920 of Table 9 may be generated. Since, the data in the attribute vector "REARRANGED ATTRIBUTE VECTOR FOR COUNTRY" 910 of Table 9 has data dependencies; the corresponding rows in the attribute vector "REARRANGED ATTRIBUTE VECTOR FOR COUNTRY" 910 are also rearranged to generate the attribute vector "REARRANGED ATTRIBUTE VECTOR FOR COUNTRY BASED ON DTE STRUCTURE FOR CUSTOMER NAME" 915 of Table 9.

In an embodiment, the execution of process 200 may optimize searching for data in the attribute vectors "COUN- TRY" 515 and "CUSTOMER NAME" 510 (as shown in FIG. 5). The attribute vectors are optimized such that the ValueIds at the top portion in the attribute vectors correspond to the major dictionary type and the ValueIds at the bottom portion in the attribute vectors correspond to the minor dictionary type. By way of example, the ValueIds in the top portion in the attribute corresponding to the major dictionary type may be sorted in ascending or descending order. Such sorting may optimize the mechanism to search for data in the attribute vectors. Similarly the ValueIds corresponding to indices I11 to I18 in the attribute vector "REARRANGED ATTRIBUTE VECTOR FOR CUSTOMER NAME BASED ON DTE STRUCTURE FOR COUNTRY" are rearranged based on the DTE structure of Table 8 (as shown in FIG. 8) to complete the rearrangement in 230 (e.g., FIG. 2).

By way of example, consider searching for data in the rearranged attribute vector "COUNTRY" using the following Structured Query Language (SQL) query:
(1) Select Count (*) from Table 1 where COUNTRY="India"

In an embodiment, the query processing engine component in the in-memory database processes the SQL query (1). The SQL query (1) may correspond to an exact match query. Since Table 9 (as shown in FIG. 9) includes optimized attribute vectors and the attribute vector "REARRANGED ATTRIBUTE VECTOR FOR COUNTRY BASED ON DTE STRUCTURE FOR CUSTOMER NAME" 915 represents optimized attribute vector for the attribute vector "COUNTRY" 315 (Table 1 as shown in FIG. 3), the output of the query SQL query (1) may return the number of rows in Table 9 containing string "India" by searching in attribute vector "REARRANGED ATTRIBUTE VECTOR FOR COUNTRY BASED ON DTE STRUCTURE FOR CUSTOMER NAME" 915. The query processing engine may determine and establish such a correspondence between the above attribute vectors of Table 1 and Table 9 and process the SQL query (1) by performing a search in the dictionary structure corresponding to the attribute vector "REARRANGED ATTRIBUTE VECTOR FOR COUNTRY BASED ON DTE STRUCTURE FOR CUSTOMER NAME" 915 For example, the query processing engine component may perform a search for string "India" in the structure Table 3. Upon determining the ValueId corresponding to string "India" from Table 3 (as shown in FIG. 4) as '4', the determined ValueId is matched with the corresponding DTE structure (e.g., Table 5 as shown in FIG. 6) to determine whether the ValueId corresponds to the major dictionary type or the minor dictionary type.

By way of example, consider the determined ValueId belongs to the major dictionary type. As explained previously, upon determining the ValueId, the corresponding attribute vector blocks including the BTIs are determined. A search for ValueId 4 (corresponding to string "India") is performed in the determined attribute vector block. Since the ValueId 4 belongs to major dictionary type, the search is performed in the attribute vector block corresponding to the major dictionary type. In an embodiment, the attribute vector block corresponding to the minor dictionary type may be skipped from searching. Thus the amount of memory to be searched is reduced, thereby optimizing the mechanism to search for data. By way of example, if the attribute vector includes 30 rows, of which 15 rows correspond to major dictionary type and 15 rows correspond to minor dictionary type, then using the previously explained mechanism, the number of rows to be searched may be reduced in half (that is, only 15 rows may need to be searched, instead of 30), thereby optimizing the mechanism for searching data.

By way of example, consider searching for data in the rearranged attribute vector "COUNTRY" using the following SQL query:
(2) Select Count (*) from Table 1 where COUNTRY>"Germany" AND COUNTRY<"Finland"

In an embodiment, the SQL query (2) may correspond to a range query. Since Table 9 (as shown in FIG. 9) includes optimized attribute vectors and the attribute vector "REARRANGED ATTRIBUTE VECTOR FOR COUNTRY BASED ON DTE STRUCTURE FOR CUSTOMER NAME" 915 represents optimized attribute vector for the attribute vector "COUNTRY", the output of the SQL query (2) may return the number of rows in Table 9 between strings "Germany" and "Finland" by searching in attribute vector "REARRANGED ATTRIBUTE VECTOR FOR COUNTRY BASED ON DTE STRUCTURE FOR CUSTOMER NAME" 915. The query processing engine may determine and establish such a correspondence between the above attribute vectors of Table 1 and Table 9 and process the SQL query (2) to determine that the search string includes value "India." A search may be performed in the dictionary structure corresponding to the attribute vector "REARRANGED ATTRIBUTE VECTOR FOR COUNTRY BASED ON DTE STRUCTURE FOR CUSTOMER NAME" 915. Considering the above example, the string "India" has a ValueId '4' belonging to major dictionary type, the search is executed in the attribute vector block corresponding to the major dictionary type. In an embodiment, the attribute vector block corresponding to the minor dictionary type may be skipped from searching. Thus the amount of memory to be searched is reduced, thereby optimizing the mechanism to search for data.

In an embodiment, the SQL query may combine two or more attribute vectors of a table using Boolean operators (e.g., AND, OR, NOT, etc.). The mechanism to search for data in the attribute vectors is optimized. For example, consider searching for data in the attribute vectors "COUNTRY" and "CUSTOMER NAME" using the following SQL query:
(3) Select Count(*) from Table 1 where COUNTRY="India" AND CUSTOMER NAME="Ana"

In an embodiment, Table 9 (as shown in FIG. 9) includes optimized attribute vectors and the attribute vector "REARRANGED ATTRIBUTE VECTOR FOR COUNTRY BASED ON DTE STRUCTURE FOR CUSTOMER NAME" 915 represents optimized attribute vector "COUNTRY" 315 (Table 1 as shown in FIG. 3); and "REARRANGED ATTRIBUTE VECTOR FOR CUSTOMER NAME BASED ON DTE STRUCTURE FOR CUSTOMER NAME" 920 represents optimized attribute vector "CUSTOMER NAME" 310 (Table 1 as shown in FIG. 3). The output of SQL query (3) returns the number of rows in Table 9 that include values "India" for attribute vector "COUNTRY" and values "Ana" for the attribute vector "CUSTOMER NAME." As discussed previously, a ValueId 4 corresponding to string "India" (e.g., from Table 3) and ValueId 1 corresponding to string "Ana" (e.g., from Table 2) may be determined.

By way of example, consider the ValueId 4 corresponding to string "India" belongs to major dictionary type and the attribute vector block corresponds to indices I1 to I10 and the ValueId corresponding to string "Ana" belongs to the minor dictionary type and the attribute vector block corresponds to indices I8 to I16. Since there is an overlap in the indices, the execution of SQL query (3) would search and retrieve records corresponding to the row with indices I8 and I10 for attribute vector corresponding to "REARRANGED ATTRIBUTE VECTOR FOR CUSTOMER NAME BASED ON DTE STRUCTURE FOR CUSTOMER NAME" 920 and I8 for attribute vector "REARRANGED ATTRIBUTE VECTOR FOR COUNTRY BASED ON DTE STRUCTURE FOR CUSTOMER NAME" 915. Thus the amount of memory to be searched is reduced, thereby optimizing the mechanism to search for data.

In an embodiment, the process 200 may optimize the mechanism to search for data of various data types. For example, the attribute vectors may include data types, such as, strings, real numbers, decimal numbers, etc. Consider an attribute vector that represents quantity of product sales (in units) and is associated with a dictionary structure. As explained previously, the DTE structure for such a dictionary structure may be generated.

FIG. 10 is a block diagram exemplarily illustrating tables residing in a data store, according to an embodiment. By way of illustration, Table 10 shows "DTE STRUCTURE OF PRODUCT SALES" including "DICTIONARY TYPE" 1005, "START INDEX" 1010 and "END INDEX" 1015. By way of example, consider an attribute vector including decimal numbers and associated with a dictionary structure. As described previously, the DTE structure for such a dictionary structure may be generated by virtually splitting the dictionary structure. By way of illustration, Table 11 shows the "DTE STRUCTURE OF TEMPERATURE" including DICTIONARY TYPE" 1020, "START INDEX" 1025 and "END INDEX" 1030.

Figure 11:
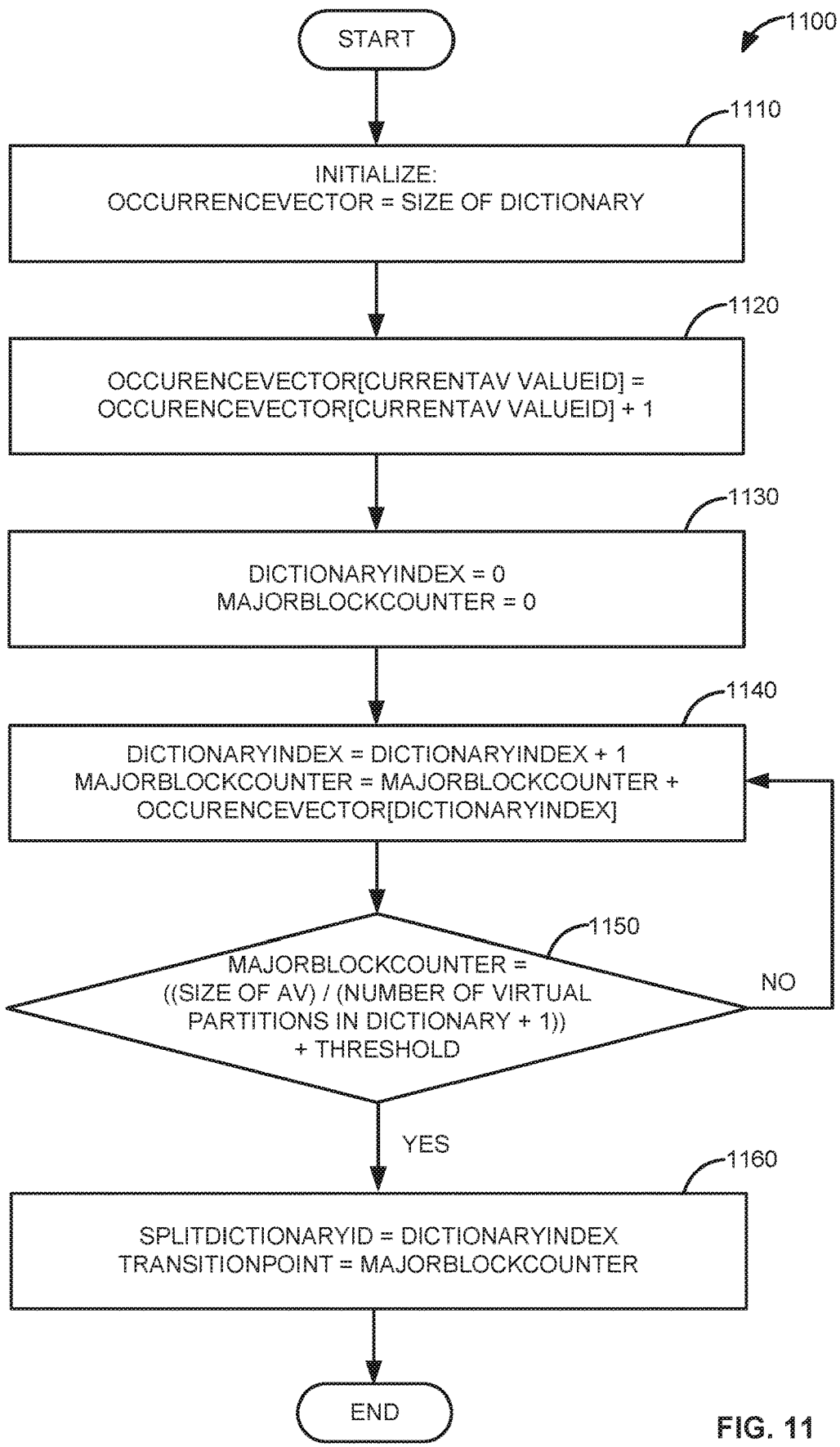
FIG. 11 is a flow diagram illustrating a process for generating a DTE structure and determining BTI structure for an attribute vector, according to an embodiment.

FIG. 11 is a flow diagram illustrating process 1100 for generating a DTE structure and determining BTI structure for an attribute vector, according to an embodiment. Process 1100, upon execution, provides a mechanism to generate or create DTE structure and generate or determine BTI structure for an attribute vector. The attribute vector may be associated with a dictionary structure that stores unique values and corresponding value identifiers (ValueIds). For example, consider an array data structure representing an Occurrence Vector (OV) that may store the unique frequently occurring ValueIds in the attribute vector. The size (e.g., in bytes) of the OV may be equal to the size of the dictionary structure associated with the attribute vector. At 1110, a variable OV (e.g., representing the array data structure Occurrence Vector) may be initialized to the size of the dictionary structure. By way of example, consider executing:

$$OV = Sizeof(dictionary) \qquad \text{Equation (1):}$$

Upon initialization, the OV may traverse the attribute vector to store the occurrence of ValueIds in the attribute vector. For example, at 1120, the OV may store the occurrence of ValueIds of the attribute vector by executing:

$$OV[Current AVValueId] = OV[Current AVvalueid] + 1 \qquad \text{Equation (2):}$$

The process continues at 1130, where variables (e.g., DictionaryIndex, MajorBlockCounter) are initialized. The one or more data structures, such as, DictionaryIndex that may correspond to dictionary types and MajorBlockCounter that may correspond to start index or end index of the attribute vector blocks. By way of example, initialization of such data structures may be performed by executing:

$$DictionaryIndex = 0 \qquad \text{Equation (3):}$$

$$MajorBlockCounter = 0 \qquad \text{Equation (4):}$$

The process 1100 continues at 1140, where the data structure variable "DictionaryIndex" may be used to traverse the data structure OV. By way of example, consider the execution of the following, to traverse the data structure OV:

$$DictionaryIndex = DictionaryIndex + 1 \qquad \text{Equation (5):}$$

$$MajorBlockCounter = MajorBlockCounter + OV[DictionaryIndex] \qquad \text{Equation (6):}$$

The process 1100 continues at 1150, where a check is performed whether the variable "MajorBlockCounter" meets a predetermined condition. If such the variable meets such a predetermined condition (indicated by "YES"), the process 1100 continues at 360. Otherwise, (indicated by "NO"), the process 1100 loops back to 1140. The predetermined condition may correspond to determining block transition start index or block transition end index and may be based on the number of splits or partitions created on the dictionary structure. By way of example, consider the following execution for such determination:

$$MajorBlockCounter = \frac{Sizeof(AttributeVector(AV))}{(\text{Number of virtual splits on the dictionary}) + 1} + \text{Threshold} \qquad \text{Equation (7)}$$

At 1160, the DTE structure may be generated and BTI structure for the attribute vector blocks may be determined. By way of example, the DTE structure is generated and the corresponding BTI structure is generated or determined, e.g., by executing:

$$SplitDictionaryID = DictionaryIndex \qquad \text{Equation (8):}$$

$$TransitionPoint = MajorBlockCounter \qquad \text{Equation (9):}$$

The variable "SplitDictionaryID" is used to generate the DTE structure, and the variable "TransitionIndex" is used for the determination and/or creation of BTIs included in the BTI structure.

Multiple Virtual Splits in Dictionary

In an embodiment, based on the number of unique ValueIds in the dictionary structure and the amount of memory available in the system, a user or the system may determine the number of splits to be performed on the dictionary structure. By way of example, consider generating a DTE structure for Table 2 by performing or creating three splits on the dictionary structure (e.g., three splits on the dictionary structure will generate four virtual partitions). In such a case, the DTE structure may include four dictionary types. By way of illustration, FIG. 10 shows Table 12 representing the DTE structure generated by performing three splits on Table 2, thereby creating or generating four dictionary types. Table 12 representing a "DTE STRUCTURE FOR NAME" includes "DICTIONARY TYPE" 1035, "START INDEX" 1040 and "END INDEX" 1045. The "DICTIONARY TYPE" 1035 includes values '0', '1', '2' and '3' As explained previously, based on the definitions corresponding to the DTE structure in Table 12, the attribute vector may be split into four attribute vector blocks. Each attribute vector block may be identified by the corresponding block transition start indices and block transition end indices.

Single Column Attribute Vector Optimization

In an embodiment, determining an attribute vector (e.g., a column of a table) to be optimized for searching data may be based on business criteria. By way of example, the business criteria may include selecting a most frequently searched column; a foreign key column; a column containing unique string values, etc. As explained previously, the selected attribute vector may be optimized for searching data.

Multiple Columns Attribute Vector Optimization

In an embodiment, multiple columns representing multiple attribute vectors may be selected by a user for optimizing the search of data. By way of example, consider the user selecting two attribute vectors, namely, attribute vector 'A' and attribute vector 'B'. As explained previously, the dictionary structures associated with the attribute vector 'A' and the attribute vector 'B' are determined. Upon determining the corresponding dictionary structures, the DTE structure for attribute vector 'A' is generated and the corresponding BTI structure is determined. Similarly the DTE structure for attribute vector 'B' is generated. However, since two attribute vectors are selected initially, the BTI structure corresponding to attribute vector 'B' is modified to include the block transition indices (e.g., block transition start index, block transition end index, etc.) of attribute vector 'A'. The BTI structure of attribute vector 'B' is modified by determining a new transition index or a new transition point, such that the new transition index or transition point corresponds to block transition start indices and/or block transition end indices of attribute vector 'A'.

By way of example, consider attribute vector 'A' includes 1 million (1000000) unique records corresponding to a transaction 'A' and attribute vector 'B' has 10000 unique records corresponding to the transaction 'A.' As explained previously, the DTE structure corresponding to attribute vector 'A' may be generated.

FIG. 12 is a block diagram exemplarily illustrating tables residing in a data store, according to an embodiment. By way of illustration, FIG. 12 shows Table 13 representing the "DTE STRUCTURE OF ATTRIBUTE VECTOR 'A'" including data structures to store "DICTIONARY TYPE" 1205, "START INDEX" 1210 and "END INDEX" 1215. Table 13 shows respective indices that include "START INDEX" 1210 and "END INDEX" 1215 with values '0' and '4000' for major dictionary type and '4001' and '1000000' for minor dictionary type.

As explained previously, based on the DTE STRUCTURE OF ATTRIBUTE VECTOR 'A', the BTI structure corresponding to attribute vector 'A' may be determined/generated. By way of illustration, FIG. 12 shows Table 14 representing the "BTI STRUCTURE FOR ATTRIBUTE VECTOR 'A'" that includes "DICTIONARY TYPE" 1220, "BLOCK TRANSITION START INDEX" 1225 and "BLOCK TRANSITION END INDEX" 1230. Table 14 shows respective indices that include "BLOCK TRANSITION START INDEX" 1225 and "BLOCK TRANSITION END INDEX" 1230 with values '0' and '540000000' for major dictionary type and '540000001' and '1000000000' for minor dictionary type.

By way of example, consider generating the DTE structure corresponding to attribute vector 'B.' By way of illustration, FIG. 12 shows Table 15 representing the "DTE STRUCTURE OF ATTRIBUTE VECTOR 'B'" including data structures to store "DICTIONARY TYPE" 1235, "START INDEX" 1240 and "END INDEX" 1245. Table 15 shows respective indices that include "START INDEX" 1240 and "END INDEX" 1245 as '0' and '2000' for major dictionary type and '2001' and '10000' for minor dictionary type.

By way of illustration, Table 15 shows the "DTE STRUCTURE OF ATTRIBUTE VECTOR 'A'" includes data structures to store "DICTIONARY TYPE"; and "START INDEX" and "END INDEX" corresponding to each dictionary type. As Table 15 shows that the start index and end index for major dictionary type are '0' and '2000' respectively and the corresponding indices for minor dictionary type are '2001' and '10000' respectively.

As explained previously, based on the DTE STRUCTURE OF ATTRIBUTE VECTOR 'B', the BTI structure corresponding to attribute vector 'B' may be determined/generated. By way of illustration, FIG. 12 shows Table 16 representing the "BTI STRUCTURE FOR ATTRIBUTE VECTOR 'B'" that includes "DICTIONARY TYPE" 1250, "BLOCK TRANSITION START INDEX" 1255 and "BLOCK TRANSITION END INDEX" 1260. Table 16 shows respective indices that include "BLOCK TRANSITION START INDEX" 1255 and "BLOCK TRANSITION END INDEX" 1260 with values '0' and '340000000'; '540000001' and '730000063' for major dictionary types and '340000001' and '540000000'; '730000064' and '1000000000' for minor dictionary types.

By way of illustration, Table 16 shows "BLOCK TRANSITION START INDEX" 1255 and "BLOCK TRANSITION END INDEX" 1260 that are adjusted/modified to include BTIs of attribute vector 'A' and attribute vector 'B'. As explained previously, the transition point/transition index corresponding to attribute vector 'A' may be determined and the ValueIds in attribute vector 'A' may be rearranged. Similarly, the transition point/transition index corresponding to attribute vector 'B' may be identified and the ValueIds in the attribute vector 'B' may be rearranged, thereby optimizing attribute vector 'A' and attribute vector 'B' for searching data. In an embodiment, based on the BTI structure for attribute vector 'B', a transition point between the attribute vector 'A' and the attribute vector 'B' may also be determined, as explained previously.

In an embodiment, upon determining the new transition indices or new transition points including BTIs of attribute vector A and BTIs of attribute vector B, as explained previously, the attribute vector 'A' and the attribute vector 'B' are split and the ValueIds are rearranged. The rearrangement of ValueIds may optimize the attribute vector 'A' and the attribute vector 'B' for searching data.

Figure 13:
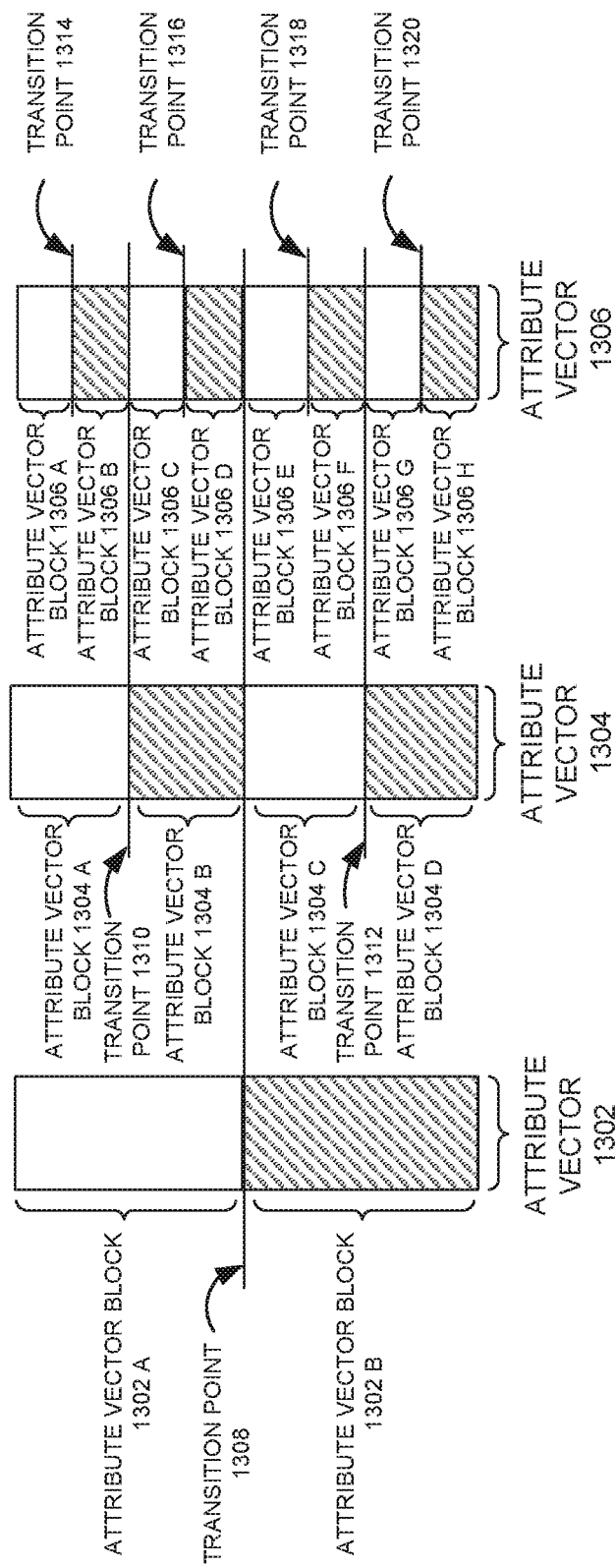
FIG. 13 is a block diagram illustrating tables residing in a data store, according to an embodiment.

FIG. 13 is a block diagram illustrating tables residing in a data store, according to an embodiment. By way of illustration, FIG. 13 shows attribute vectors 1302, 1304 and 1306 residing in a data store. The attribute vector blocks 1302, 1304 and 1306 are associated with a corresponding dictionary structure. The DTE structures for the corresponding to the attribute vector blocks may be generated, as explained previously. Based on the DTE structures, the attribute vector blocks 1302, 1304, and 1306 may be split into attribute vector blocks. By way of illustration, FIG. 13 shows attribute vector blocks 1302 A and 1302 B corresponding to attribute vector 1302. Likewise, 1304 A, 1304 B, 1304 C and 1304 D represent attribute vector blocks corresponding to attribute vector block 1304; and 1306 A, 1306 B, 1306 C, 1306 D, 1306 E, 1306 F, 1306 G and 1306 H represent attribute vector blocks corresponding to attribute vector block 1306.

In an embodiment, the lines 1308, 1310, 1312, 1314, 1316, 1318 and 1320 indicate the respective transition points between the attribute vector blocks. As explained previously, the ValueIds in the attribute vector blocks may be rearranged to optimize the attribute vector blocks for searching. By way of example, the attribute vector block 1302 corresponds a single split on the associated dictionary structure, thereby creating/generating two attribute vector blocks (1302 A, 1302 B). Likewise, the attribute vector block 1304 corresponds to two splits, such that the attribute vector blocks 1302A and 1302B, may be split to generate/create four attribute vector blocks (1304 A, 1304 B, 1304 C and 1304 D). In an embodiment, once the attribute vector (e.g., 1302) is optimized upon rearrangement, the ValueIds in the attribute vector (e.g., 1302) will correspond to their respective dictionary types and will not get impacted with rearrangements of the attribute vector 1304. The ValueIds in the attribute vector blocks 1304 A and 1304 B may be rearranged within the transition point of the attribute vector (e.g., 1302) indicated by line 1308.

In an embodiment, the attribute vector block 1306 may correspond to two splits on the associated dictionary, thereby creating/generating eight attribute vector blocks (1306 A-1306 H). As explained previously, ValueIds in the attribute vector blocks may be rearranged in the attribute vector blocks (e.g., 1304 A-1304 D) and new transition points (1314, 1316, 1318 and 1320) may be identified. As explained previously, the ValueIds in the attribute vector blocks (e.g., 1304 A-1304 D) within their respective transition points may be rearranged to optimize the attribute vector blocks for searching data.

Memory Utilized by DTE and BTI

In an embodiment, the amount of memory utilized for generating the DTE structure and the BTI structure may increase exponentially. For instance, the amount of memory utilized (e.g., in bytes) may depend on the number of attribute vectors selected to be optimized for searching and the number of splits created on the corresponding dictionary structures associated with the attribute vectors. For instance, the amount of memory utilized (e.g., in bytes) for generating a DTE structure for an attribute vector may be computed using:

$$\text{Memory utilized by DTE Structure} = S*(\text{ceil}(\log(S)) + 2*(\text{ceil}(\log_2(N)))) \quad \text{Equation (10)}$$

In equation (10) above, 'S' represents the number of dictionary types; 'N' represents the number of unique values in the dictionary structure (or number of unique ValueIds in the dictionary structure).

In an embodiment, the amount of memory (e.g., in bytes) utilized for corresponding to the BTI structure for a single attribute vector block, associated with a dictionary structure may be computed using:

$$\text{Memory utilized by Block}, B = (\text{ceil}(\log_2(S)) + 2*(\text{ceil}(\log_2(T)))) \quad \text{Equation (11)}$$

$$S*B \quad \text{Equation (12)}$$

In equation (11) above, 'S' represents the number of dictionary types; 'T' represents the size (e.g., in bytes) of attribute vector (or number of records in the attribute vector). The size of BTI structure for a multiple columns, where 'M' represents the position of columns while optimizing, may be computed using:

$$\text{Size of BTI structure} = S^M * B \quad \text{Equation (13)}$$

In an embodiment, the number of splits to be created on a dictionary structure associated with an attribute vector may be determined based on the amount of memory available. For instance, the amount of memory utilized increases exponentially with the number of attribute vectors selected for optimizing search. The amount of memory (in bytes) utilized for optimizing 'N' columns may be computed using:

$$\text{Memory utilized for } N \text{ columns} = \sum_{i=1}^{N} B_i * S^i \quad \text{Equation (14)}$$

In an embodiment, consider an attribute vector to include 2 billion records. Consider '6' such attribute vectors, each associated with a dictionary structure and each dictionary structure including a million (1000000) unique string values. Consider rearranging data in '6' attribute vectors (that is N=6) and consider creating 10 dictionary types (that is, S=10) corresponding to each of the dictionary structures. Then, using the equation (14), the amount of memory utilized for generating DTE structures and BTI structures may be computed to be equal to 8.212 MB. Similarly, for N=7, S=11, the amount of memory utilized may be computed to be equal to 158.432 MB. Hence, the amount of memory utilized for generating DTE structures and BTI structures increases exponentially with the number of dictionary types and the number of attribute vectors.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 14:
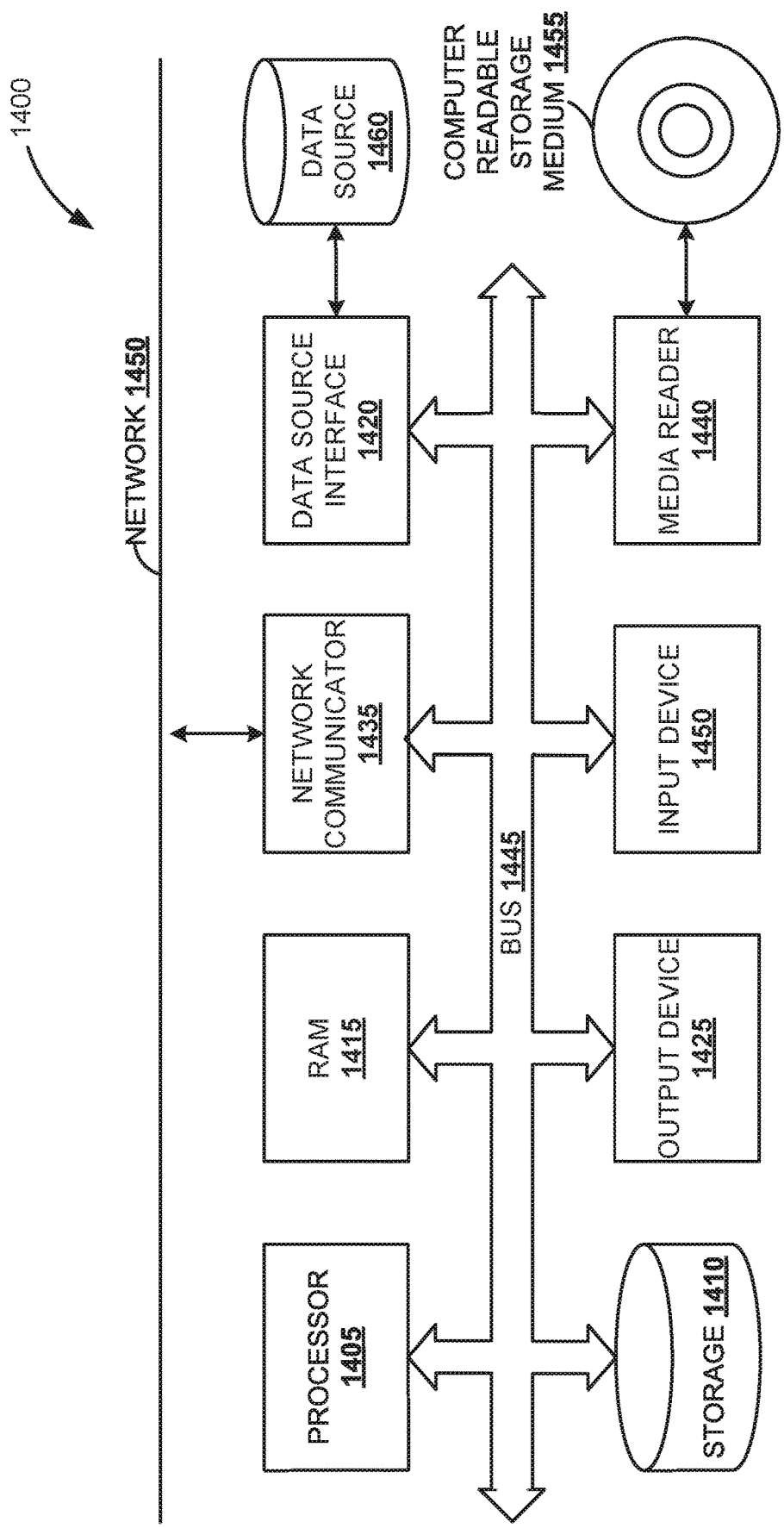
FIG. 14 is a block diagram of a computer system, according to an embodiment.

FIG. 14 is a block diagram of an exemplary computer system 1400, according to an embodiment. Computer system 1400 includes processor 1405 that executes software instructions or code stored on computer readable storage medium 1455 to perform the above-illustrated methods. Processor 1405 can include a plurality of cores. Computer system 1400 includes media reader 1440 to read the instructions from computer readable storage medium 1455 and store the instructions in storage 1410 or in random access memory (RAM) 1415. Storage 1410 provides a large space for keeping static data where at least some instructions could be stored for later execution. According to some embodiments, such as some in-memory computing system embodiments, RAM 1415 can have sufficient storage capacity to store much of the data required for processing in RAM 1415 instead of in storage 1410. In some embodiments, all of the data required for processing may be stored in RAM 1415. The stored instructions may be further compiled to generate other representations of the instructions and dynamically stored in RAM 1415. Processor 1405 reads instructions from RAM 1415 and performs actions as instructed. According to one embodiment, computer system 1400 further includes output device 1425 (e.g., a display) to provide at least some of the results of the execution as output including, but not limited to, visual information to users and input device 1430 to provide a user or another device with means for entering data and/or otherwise interact with computer system 1400. Each of these output devices 1425 and input devices 1430 could be joined by one or more additional peripherals to further expand the capabilities of computer system 1400. Network communicator 1435 may be provided to connect computer system 1400 to network 1450 and in turn to other devices connected to network 1450 including other clients, servers, data stores, and interfaces, for instance. The modules of computer system 1400 are interconnected via bus 1445. Computer system 1400 includes a data source interface 1420 to access data source 1460. Data source 1460 can be accessed via one or more abstraction layers implemented in hardware or software. For example, data source 1460 may be accessed by network 1450. In some embodiments data source 1460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
generating a dictionary including a plurality of value identifiers mapped to a plurality of attribute values, respectively, wherein the plurality of attribute values are identified from data records in a data structure;
modifying the data records in the data structure by replacing an attribute value of each data record with a corresponding value identifier included in the dictionary, wherein the modification comprises mapping at least two data records that have a same attribute value to a same value identifier;
partitioning the modified data structure into a plurality of split data structures and rearranging data records among the split data structures based on the value identifiers such that each rearranged split data structure stores data records having a mutually exclusive subset of value identifiers;
in response to a query being received for an attribute, identifying a value identifier mapped to the attribute in the dictionary, identifying a rearranged split data structure storing the identified value identifier from among the plurality of rearranged split data structures, and executing the query on data records in the identified rearranged split data structure to generate search results; and
outputting information for display on a display device based on the search results.

2. The computer implemented method of claim 1, further comprising: determining a transition index corresponding to one or more block transition indices within the rearranged split data structures.

3. The computer implemented method of claim 1, wherein the dictionary includes a dictionary structure that comprises one or more dictionary types which correspond to one or more virtual partitions in the data structure.

4. The computer implemented method of claim 3, wherein the dictionary structure includes:
a dictionary type identifier indicating the plurality of rearranged split data structures;
one or more start indices corresponding to the plurality of rearranged split data structures; and
one or more end indices corresponding to the plurality of rearranged split data structures.

5. The computer implemented method of claim 1, wherein the rearranging the data records comprises swapping two data records having two different value identifiers stored in two different split data structures.

6. The computer implemented method of claim 1, wherein the query comprises one or more of an exact match query, a range query, and a query including two or more attributes combined by one or more Boolean operators.

7. A computer system comprising:
a processor; and
one or more memory devices communicatively coupled with the processor and the one or more memory devices storing instructions to:
generate a dictionary including a plurality of value identifiers mapped to a plurality of attribute values, respectively, wherein the plurality of attribute values are identified from data records in a data structure;
modify the data records in the data structure by replacing an attribute value of each data record with a corresponding value identifier included in the dictionary, wherein the modification comprises mapping at least two data records that have a same attribute value to a same value identifier;
partition the modified data structure into a plurality of split data structures and rearrange data records among the split data structures based on the value identifiers such that each rearranged split data structure stores data records having a mutually exclusive subset of value identifiers;
in response to a query being received for an attribute, identify a value identifier mapped to the attribute in the dictionary, identify a rearranged split data structure storing the identified value identifier from among the plurality of rearranged split data structures, and execute the query on data records in the identified rearranged split data structure to generate search results; and
output information for display on a display device based on the search results.

8. The computer system of claim 7, wherein the processor is further configured to determine a transition index corresponding to one or more block transition indices within the rearranged split data structures.

9. The computer system of claim 7, wherein the dictionary includes a dictionary structure that comprises one or more dictionary types which correspond to one or more virtual partitions in the data structure.

10. The computer system of claim 9, wherein the dictionary structure includes:
a dictionary type identifier indicating the plurality of rearranged split data structures;
one or more start indices corresponding to the plurality of rearranged split data structures; and
one or more end indices corresponding to the plurality of rearranged split data structures.

11. The computer system of claim 7, wherein the rearranging the data records comprises swapping two data records having two different value identifiers stored in two different split data structures.

12. The computer system of claim 7, wherein the query comprises one or more of an exact match query, a range query, and a query including two or more attributes combined by one or more Boolean operators.

13. A non-transitory computer readable storage medium tangibly storing instructions, which when executed by a computer, cause the computer to execute operations comprising:
generate a dictionary including a plurality of value identifiers mapped to a plurality of attribute values, respectively, wherein the plurality of attribute values are identified from data records in a data structure;
modify the data records in the data structure by replacing an attribute value of each data record with a corresponding value identifier included in the dictionary, wherein the modification comprises mapping at least two data records that have a same attribute value to a same value identifier;
partitioning the modified data structure into a plurality of split data structures and rearranging data records among the split data structures based on the value identifiers such that each rearranged split data structure stores data records having a mutually exclusive subset of value identifiers;
in response to a query being received for an attribute, identifying a value identifier mapped to the attribute in the dictionary, identifying a rearranged split data structure storing the identified value identifier from among the plurality of rearranged split data structures, and executing the query on data records in the identified rearranged split data structure to generate search results; and
outputting information for display on a display device based on the search results.

14. The non-transitory computer readable storage medium of claim 13, storing instructions, which when executed by a computer, cause the computer to further execute operations comprising: determine a transition index corresponding to one or more block transition indices within the rearranged split data structures.

15. The non-transitory computer readable storage medium of claim 13, wherein the dictionary includes a dictionary structure that comprises one or more dictionary types which correspond to one or more virtual partitions in the data structure.

16. The non-transitory computer readable storage medium of claim 15, wherein the dictionary structure includes:
a dictionary type identifier indicating the plurality of rearranged split data structures;
one or more start indices corresponding to the plurality of rearranged split data structures; and
one or more end indices corresponding to the plurality of rearranged split data structures.

17. The non-transitory computer readable storage medium of claim 13, wherein the rearranging the data records comprises swapping two data records having two different value identifiers stored in two different split data structures.

* * * * *